United States Patent [19]

Povejsil

[11] 4,109,546
[45] Aug. 29, 1978

[54] COMBINED THROTTLE AND TRANSMISSION SYSTEM

[75] Inventor: James H. Povejsil, Willoughby, Ohio

[73] Assignee: Towmotor Corporation, Mentor, Ohio

[21] Appl. No.: 760,067

[22] Filed: Jan. 17, 1977

[51] Int. Cl.² ................. G05G 9/00; G05G 1/14; F15B 15/18
[52] U.S. Cl. .................. 74/474; 74/478; 60/431
[58] Field of Search ........... 74/474, 478, 473, 560, 74/473 P, 513; 60/431, 433, 434; 192/0.096, 0.098

[56] References Cited

U.S. PATENT DOCUMENTS

| 3,952,512 | 4/1976 | Feller | 74/474 |
| 4,010,657 | 3/1977 | Amdall | 74/474 |
| 4,014,218 | 3/1977 | Brandt | 74/478 |

Primary Examiner—Donald R. Schran
Attorney, Agent, or Firm—Phillips, Moore, Weissenberger, Lempio & Majestic

[57] ABSTRACT

A combined control system for simultaneously controlline a vehicle throttle and transmission from a single pedal wherein the control pedal is mounted for fore and aft rocking movement with transmission linkage means connected thereto for movement therewith for controlling forward and reverse of the transmission. Linkage means for the throttle includes a pair of bell cranks mounted fore and aft of the pivot axis of the control pedal whereby one bell crank is engaged by the pedal when rocked in one direction and the other bell crank is engaged by the pedal when rocked in the opposite direction with the bell cranks connected together and to the throttle linkage means so that either direction of rocking of the control pedal imparts a movement in the same direction through one or the other of the bell cranks to the throttle control linkage.

15 Claims, 4 Drawing Figures

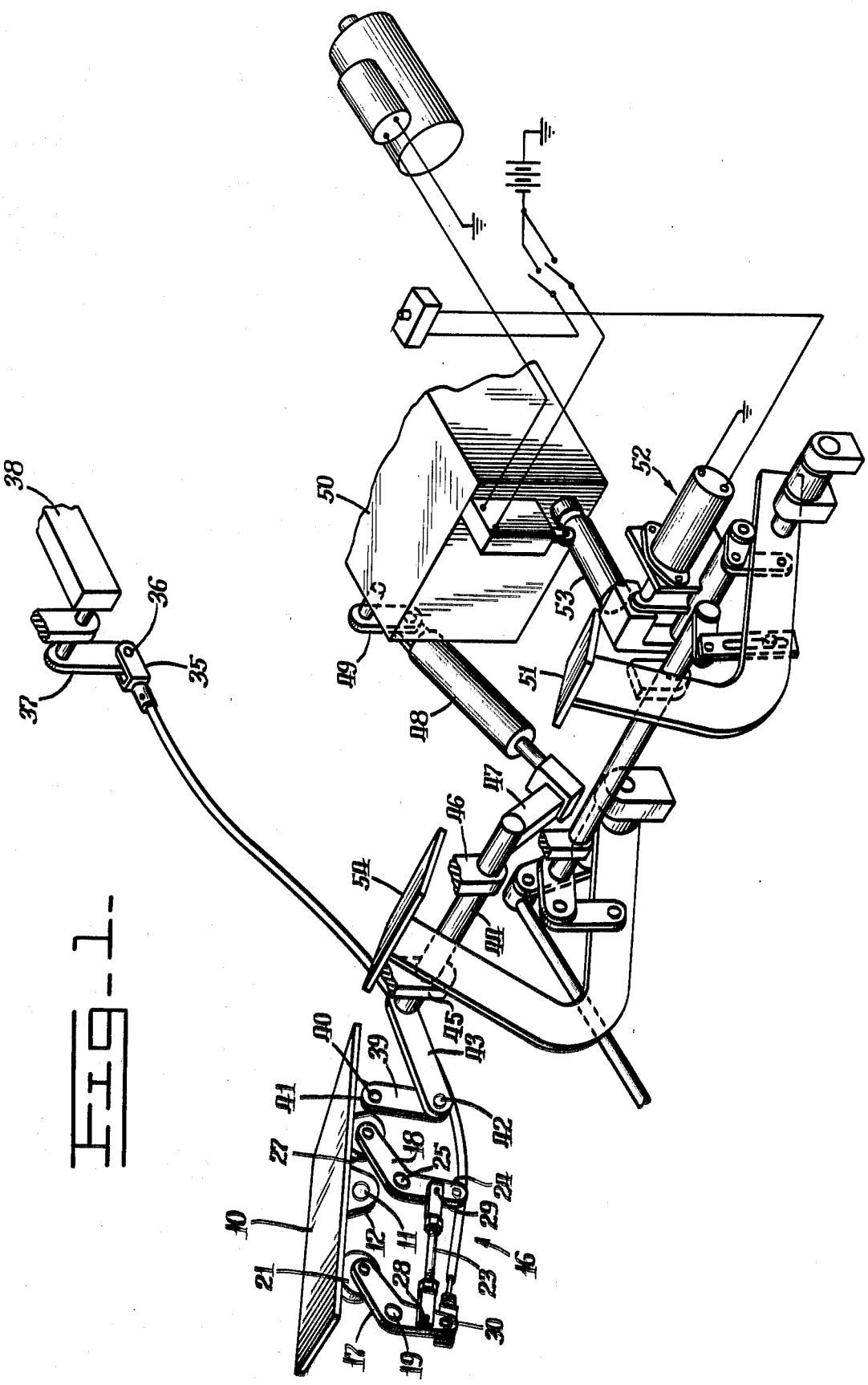

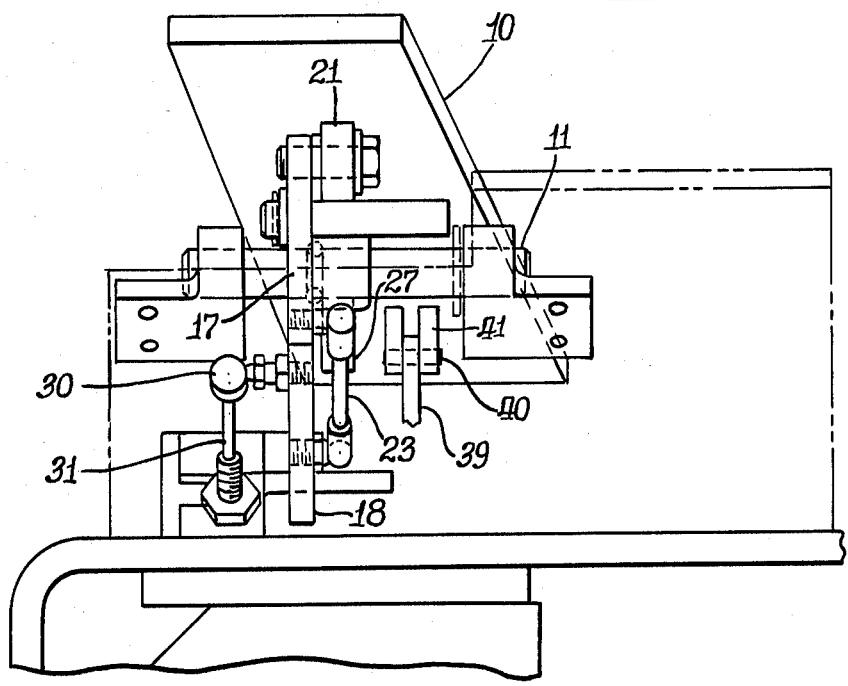
Fig-2-
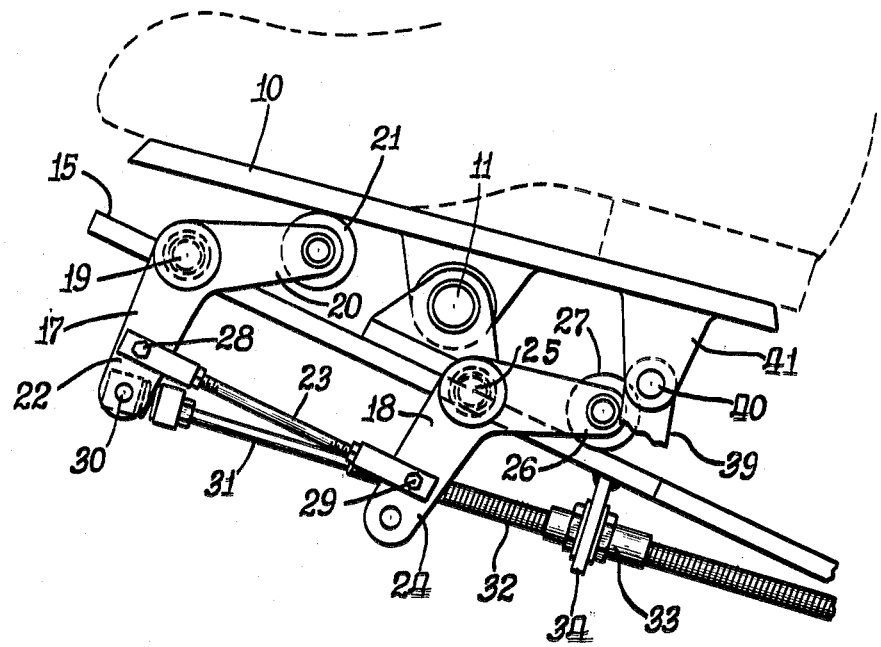
Fig-3-

COMBINED THROTTLE AND TRANSMISSION SYSTEM

BACKGROUND OF THE INVENTION

The present invention relates to control systems and pertains particularly to combined throttle and transmission control means.

Lift trucks and other similar article-handling vehicles normally require that an operator steer the vehicle and control its translation over a supporting surface at the same time that he is manipulating the article-handling implements thereof. Since the steering of the vehicle as well as the manipulation of the article-handling equipment of the vehicle is normally controlled by the operator's hands, it is necessary that he be able to control the direction and speed of the vehicle solely by means of his feet. It is therefore desirable that as many functions as possible by incorporated within a single control pedal and that the control pedal arrangement afford easy and precise control of the vehicle.

Numerous prior art approaches to such control systems have been proposed for such vehicles in the past. However, such systems have failed to provide an optimum combination to provide the desired functional convenience.

SUMMARY AND OBJECTS OF THE INVENTION

It is therefore a primary object of the present invention to provide a control arrangement for the convenient and precise control of the accelerator and the transmission directional control of a vehicle simultaneously with a single foot control member.

Another object of the present invention is to provide a vehicle control arrangement that is simple and effective to provide simultaneous operation of the throttle of the vehicle and the transmission directional control of the vehicle by means of a single control pedal.

A further object of the present invention is to provide a control arrangement for a vehicle having hydrostatic drive wherein the direction and speed of the vehicle may be controlled simultaneously by a single foot pedal.

In accordance with the primary aspect of the present invention, a control arrangement for a vehicle includes a single foot pedal mounted for rocking motion and connected for forward and reverse control of a hydrostatic transmission and includes linkage connected for advancing the vehicle throttle in a single direction from a neutral position upon movement of the foot pedal in either direction from its neutral position.

BRIEF DESCRIPTION OF THE DRAWINGS

The above and other objects and advantages of the present invention will become apparent from the following description when read in conjunction with the accompanying drawings wherein:

FIG. 1 is a perspective view of a control arrangement in accordance with the present invention;

FIG. 2 is front-elevational view of the foot pedal of the present invention;

FIG. 3 is a side-elevational view of the foot pedal of the present invention; and, FIG. 4 is a plan view of the foot pedal of the present invention.

DETAILED DESCRIPTION OF A PREFERRED EMBODIMENT

Figure 4:
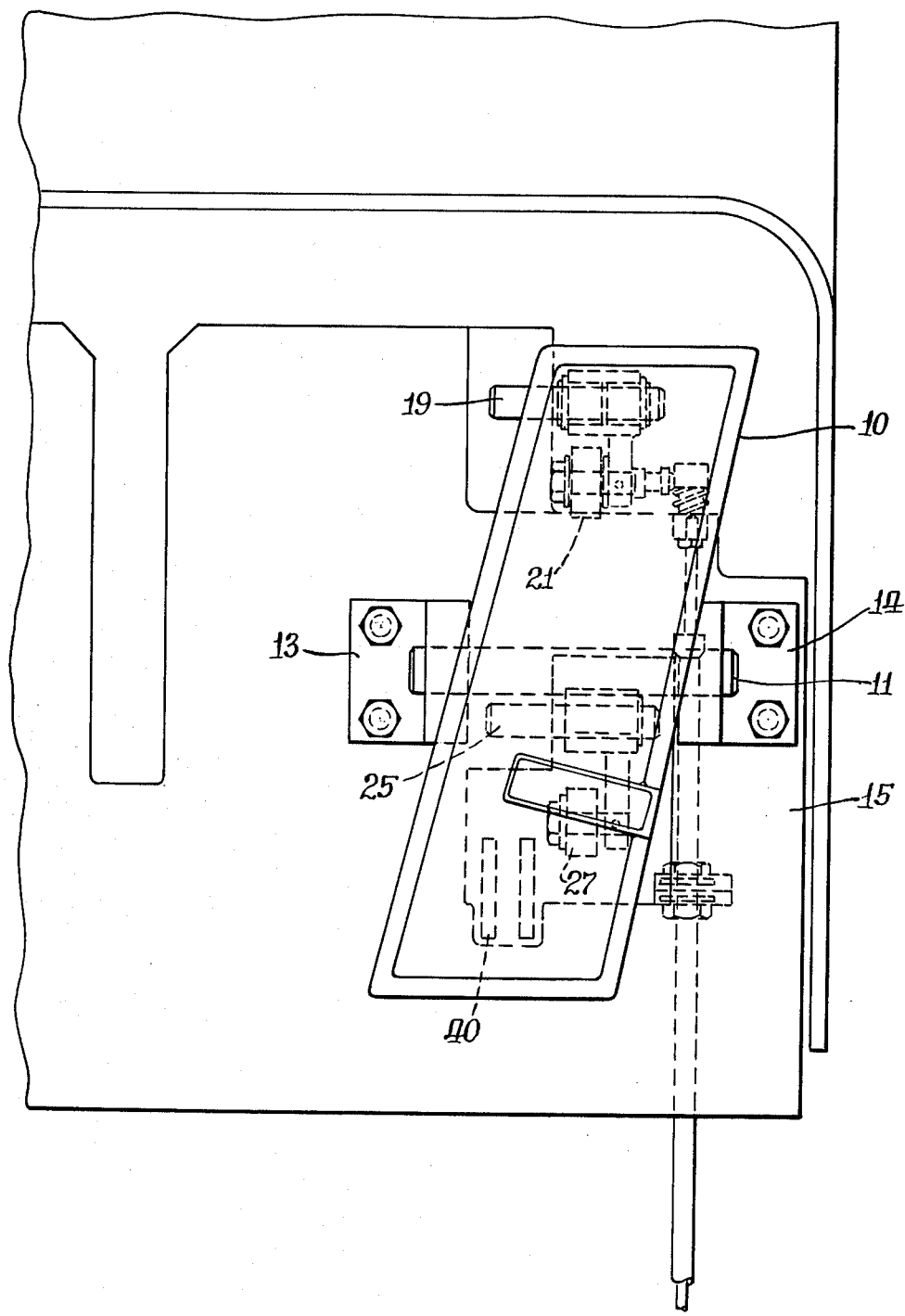

Referring now to FIG. 1 of the drawing, a control system for a hydrostatically-equipped lift truck is disclosed. Only that portion of the lift truck and the control that is necessary for an understanding of the present invention is illustrated.

The illustration of a complete hydraulic drive lift truck and a hydrostatic transmission therefor is illustrated, for example, in U.S. Pat. No. 3,005,562 issued Oct. 24, 1961 to Shaffer and assigned to the assignee hereof and is fully incorporated herein by reference. Other examples of hydrostatic transmission for use in such lift trucks or the like are illustrated, for example, in U.S. Pats. No. 3,451,218 issued June 24, 1969 to Grant, and No. 3,486,335 issued Dec. 30, 1969 to Kern, et al, both of which are assigned to the assignee hereof, and incorporated herein by reference.

A combined engine throttle or governor control and transmission control is illustrated comprising a rocker type foot pedal 10 mounted for rocking motion about a centrally located pivot pin 11 defining a pivot point around which the pedal pivots. The pin 11 extends through a bracket 12 secured to and extending downward from about midpoint of the pedal and through a pair of spaced stationary brackets 13, 14 as seen in FIGS. 2–4, mounted in a suitable manner such as bolts or the like to a stationary member such as the floorboard 15 of the vehicle.

The foot pedal 10 is connected by a throttle linkage arrangement, indicated generally by the numeral 16, which comprises first and second bell cranks 17 and 18 pivotally mounted below the pedal 10, and fore and aft respectively of the pivot axis thereof. The first bell crank 17 is pivotally mounted such as by a suitable pin 19 to the floorboard 15 and includes an upper arm 20 on which is rotatably mounted a roller 21 for engaging the underside of the foot pedal 10. A lower or second arm 22 extends downward from the pivot point 19 and is connected by an adjustable link 23 to a lower arm 24 of bell crank 18. The bell crank 18 is similarly pivotally mounted by means of a pivot pin 25 to the floorboard 15 and includes an upper or first arm 26 extending upward therefrom and on which is mounted a roller 27 which engages the underside of pedal 10 aft of the pivot axis or pin 11.

The link 23 is pivotally connected at its ends 28, 29 to the lower arms 22, 24 respectively of the bell cranks 17, 18. The adjustable length of the link 23 permits an adjustment of the position of the rollers 21, 27 with respect to the underside of the pedal 10 when the pedal and the throttle linkage are respectively in the neutral position. This adjustable link 23 permits adjustment of the throttle and the transmission linkage to correspond and to permit a delay or play to be adjustable in the throttle linkage if desired. The amount of movement of the pedal 10 before engagement of either arm 20 or 26 is engaged represents play. This permits the bell cranks 17 and 18 to be properly timed to give the proper amount of lost motion (play) in the neutral range of the throttle and/or transmission linkage. This adjustment also permits synchronization of the throttle and transmission control.

One or the other of the lower arms 22, 24 is connected such as by a pin 30 to suitable linkage such as a boden wire cable comprising an inner movable flexible wire member 31 and an outer sleeve member 32. The outer sleeve 32 of the boden wire cable is secured by suitable adjusting means 33 to a bracket 34 secured to the underside of the floorboard 15. The opposite end of the boden wire cable is secured such as by means of a suitable bracket or clevis 35 connected to the end of the wire 31 such as by means of a pin 36 to suitable linkage means such as an arm 37 which is connected in a suitable manner to a throttle or governor control 38 of an engine (not shown) of the vehicle.

The terms "throttle" and "governor" are used interchangeably herein to simply mean control means for controlling the r.p.m. of the engine of a vehicle.

The operation of the above-described linkage will become apparent when viewing FIGS. 1 and 3. As shown in FIG. 1, the foot pedal 10 is positioned in its neutral position with the linkage 16 also positioned in its neutral position such as with the engine of the vehicle idling. It will be appreciated that since both rollers 21, 27 are in engagement with the underside of the pedal 10, upon motion of the pedals in either direction from the neutral position such as in the forward direction as shown in FIG. 3, contact of the roller 21 by the underside of the pedal 10 will force the roller 21 and arm 20 of link 17 downward causing the bell crank to pivot about its axis 19 and thereby causing arm 22 to move about the axis 19 in a forward direction. This forward movement of the arm 22 pulls cable 31 forward in the sleeve 32 and likewise the opposite end of the cable pulls arm 37 causing an advance of the throttle or linking governor 38.

It will be likewise appreciated that, should the pedal 10 be pivoted in the opposite direction, the lower side of pedal 10 will engage roller 27 on arm 26 of bell crank 18 forcing it forward pivoting about pin 25 causing the lower arm 24 thereof to move forward and transmit the force or movement thereof by way of link 23 to the arm 22. The cable 31, being connected to the lower arm 22, will be moved forward in sleeve 32 as previously described to advance the throttle or governor control 38 and thereby increase the r.p.m. of the vehicle engine or prime mover.

The control pedal 10 is connected by suitable transmission control linkage means to a hydrostatic transmission of the vehicle. This transmission control linkage comprises a link 39 pivotally connected by a pin 40 to a bracket 41 on the underside of pedal 10. The lower end of link 39 is connected by a pin 42 to a lever arm 43 connected to a shaft 44 mounted in spaced journal brackets 45, 46. The opposite end of shaft 44 includes a second crank arm 47 connected by lost motion or override linkage means including a lost motion link 48 to an arm 49 which in turn is connected in a suitable manner to control the tilt of the swash plate in a hydrostatic transmission 50. The term "lost motion linkage" or link, as referred to by link 48, is intended to be used herein in its usual manner to refer to a link which is specifically constructed to permit one end to move relative to the other end when certain forces are exceeded along the axis thereof. Such terminology is not intended to cover or refer to the usual play or sloppiness achieved from wear of a conventional link. When the transmission valve is fully shifted, the lost motion (override) link permits the rocker pedal to move further to continue to move the throttle in order to obtain more engine speed. The transmission is normally adjusted to obtain full displacement thereof at about one-half throttle of the engine. Additional speed of the vehicle is obtained by advancing the throttle further.

Hydrostatic transmissions such as that schematically designated by the numeral 50 normally employ a hydraulic pump and a hydraulic motor, both of which are normally swash plate type and one of which the pump is normally of the variable displacement type, such that no output is obtained when the pump is in zero displacement position, and forward and reverse is obtained by swiveling the swash plate in one direction or another from its neutral position.

It will be appreciated that when the pedal 10 is tilted in either the forward or reverse direction that motion is transferred through the linkage 39-49 to the transmission control valve which controls the displacement and/or direction of the hydrostatic transmission 50 by tilting the swash plate in the appropriate direction for forward or reverse of the vehicle. It will also be appreciated that the degree of tilt of the swash plate will also be proportional to the degree of tilt of the foot pedal 10 over the range of joint movement thereof.

Other controls of the vehicle will include a creeper control pedal 51 connected by suitable linkage, indicated generally at 52, to a vent valve or the like 53 to control venting of the transmission of the vehicle under certain conditions for obtaining high engine r.p.m. for lifting loads, and at the same time obtaining slow translation of the vehicle. The illustrated system also includes a brake pedal 54 connected through appropriate linkage to the brake actuating circuit and also is interconnected with the creeper control mechanism or system.

While the present invention has been described by means of specific embodiments, it is to be understood that numerous changes and modifications may be made therein without departing from the spirit and scope of the invention, as defined in the appended claims.

What is claimed is:

1. A control linkage mechanism for simultaneously and proportionately controlling a unidirectional control element and a bidirectional control element by a single control member, the combination comprising:

an operator input control member mounted for rocking motion in either direction from a neutral position;

a bidirectional control element remotely positioned from said input control member and mounted for bidirectional movement from a neutral position;

first control linkage means for connecting said input control member to said bidirectional control element for movement of said bidirectional control element in either one of two directions;

a unidirectional control element remotely positioned from said input control member and mounted for movement in a single direction from a neutral position;

second control linkage means for connecting said input control member to said unidirectional control element for movement of said unidirectional control element in a single direction from the neutral position thereof upon movement of said input control member in either direction from the neutral position thereof and comprising first and second bellcranks mounted adjacent said input control member, each of said bellcranks having a first arm disposed for engagement by said input control member, said first and second bellcranks being so mounted adjacent said pedal that pivotal movement of said input control member in one direction engages the first arm of one of said bellcranks and pivots one of said bellcranks in a first direction about its axis, and so that pivotal movement of said input control member in another direction engages the first arm of the other of said bellcranks and pivots said other bellcranks in said first direction about its axis and link means for connecting said unidirectional control element to said bellcranks for movement therewith from its neutral position in said single direction.

2. The control linkage mechanism of claim 1 wherein said link means comprises a link member pivotally connected between said first and said second bellcranks for thereby connecting said bellcranks for simultaneous movement.

3. The control linkage mechanism of claim 2 wherein said link member is adjustable so that said first arm of said bellcranks may be selectively positioned with respect to said input control member.

4. The control linkage mechanism of claim 2 wherein said second control linkage means includes a wire cable connected at one end to one of said bellcranks and connected at the other end to said unidirectional control element.

5. The control linkage mechanism of claim 1 including roller means mounted on the end of the first arm of each of said bellcranks for selective engagement by said input control member.

6. The control linkage mechanism of claim 1 wherein said first control linkage means includes an override linkage means.

7. In a vehicle having ground engaging wheels, a variable speed prime mover and a hydrostatic transmission for transmitting power from the engine to the wheels, a control system for simultaneously and proportionately controlling the speed of the prime mover and the ratio of the transmission of the vehicle by a single control pedal, the combination comprising:

a rocker pedal mounted for rocking motion in either direction from a neutral position about an axis;

a throttle element for said prime mover remotely positioned from said rocker pedal and mounted for movement in a single direction from a neutral position;

throttle linkage means connecting said rocker pedal to said throttle element for movement of said throttle element in said single direction from the neutral position thereof upon movement of said rocker pedal in either direction from the neutral position thereof, and comprising, first and second bell cranks mounted adjacent said pedal, each of said bell cranks having a first arm disposed for engagement by said rocker pedal, said first and second bell cranks being so mounted adjacent said pedal that pivotal movement of said pedal in one direction engages the first arm of one of said bell cranks and pivots one of said bell cranks in a first direction about its axis, and so that pivotal movement of said pedal in another direction engages the first arm of the other of said bell cranks and pivots said other bell crank in said first direction about its axis and, link means for connecting said throttle element to said bell cranks for movement therewith from its neutral position in said single direction.

8. The control system of claim 7 wherein said link means comprises a link member pivotally connected between said first and said second bell cranks for thereby connecting said bell cranks for simultaneous movement.

9. The control system of claim 8 wherein said throttle linkage means includes a wire cable connected at one end to one of said bell cranks and connected at the other end to said throttle element.

10. The control system of claim 7 including roller means mounted on the end of the first arm of each of said bell cranks for engagement by said pedal.

11. The control system of claim 7 further including a transmission control element and transmission linkage means, said transmission linkage means connecting said pedal to said transmission control element for movement therewith.

12. The control system of claim 11 wherein said link member is adjustable so that said first arm of said bell cranks may be selectively positioned with respect to said input control member.

13. The control linkage system of claim 12 wherein said throttle linkage means includes a wire cable connected at one end to one of said bell cranks and connected at the other end to said unidirectional control element.

14. The control linkage mechanism of claim 13 including roller means mounted on the end of the first arm of each of said bell cranks for selective engagement by said input control member.

15. The control system of claim 14 wherein said transmission linkage means includes an override linkage means.

* * * * *